(12) United States Patent
Merriman et al.

(10) Patent No.: US 9,627,725 B2
(45) Date of Patent: Apr. 18, 2017

(54) BATTERY PACK

(71) Applicant: LG Chem, Ltd., Seoul (KR)

(72) Inventors: Robert Merriman, Shelby Township, MI (US); Heekook Yang, Troy, MI (US); Satish Ketkar, Troy, MI (US); Rick H. Rajaie, Rochester Hills, MI (US); Steven Alvey, Rochester Hills, MI (US)

(73) Assignee: LG Chem, Ltd., Seoul (KR)

( * ) Notice: Subject to any disclaimer, the term of this patent is extended or adjusted under 35 U.S.C. 154(b) by 234 days.

(21) Appl. No.: 14/698,376

(22) Filed: Apr. 28, 2015

(65) Prior Publication Data

US 2016/0322680 A1    Nov. 3, 2016

(51) Int. Cl.
| | | |
|---|---|---|
| H01M 10/50 | (2006.01) | |
| H01M 10/6551 | (2014.01) | |
| H01M 10/613 | (2014.01) | |
| H01M 10/63 | (2014.01) | |
| H01M 10/6572 | (2014.01) | |

(52) U.S. Cl.
CPC ..... *H01M 10/6551* (2015.04); *H01M 10/613* (2015.04); *H01M 10/63* (2015.04); *H01M 10/6572* (2015.04)

(58) Field of Classification Search
CPC .......... H01M 10/6551; H01M 10/613; H01M 10/63; H01M 10/6572
See application file for complete search history.

(56) References Cited

U.S. PATENT DOCUMENTS

| | | | |
|---|---|---|---|
| 8,492,642 B2* | 7/2013 | Kim | H01M 10/486 |
| | | | 136/200 |
| 8,574,734 B2 | 11/2013 | Eisenhour | |
| 8,658,299 B2 | 2/2014 | Yang et al. | |
| 8,703,320 B2 | 4/2014 | Sohn | |
| 8,974,942 B2 | 3/2015 | Bell et al. | |
| 2004/0135550 A1* | 7/2004 | Nishihata | G05D 23/1919 |
| | | | 320/150 |
| 2014/0030560 A1* | 1/2014 | Lev | H01M 10/647 |
| | | | 429/72 |
| 2014/0072845 A1* | 3/2014 | Oh | H01M 2/1077 |
| | | | 429/71 |

* cited by examiner

*Primary Examiner* — Raymond Alejandro
(74) *Attorney, Agent, or Firm* — Buckert Patent & Trademark Law Firm P.C.; John F. Buckert (57) ABSTRACT

A battery pack having a battery module, a thermoelectric heat pump, and a cooling manifold is provided. The battery module has a first battery cell, a housing, and a first solid cooling fin. A first panel portion of the first solid cooling fin is disposed against the first battery cell. A second panel portion of the first solid cooling fin is disposed on an outer surface of the housing and is coupled to an end portion of the first panel portion. A first side of the thermoelectric heat pump is disposed against the second panel portion, and a second side of the thermoelectric heat pump is disposed against the cooling manifold. The thermoelectric heat pump transfers heat energy from the first solid cooling fin to the cooling manifold in response to a first electrical current flowing through the thermoelectric heat pump in a first direction, to reduce a temperature level of the first battery cell.

12 Claims, 10 Drawing Sheets

FIG. 12

BATTERY PACK

BACKGROUND

The inventors herein have recognized a need for an improved battery pack having a thermoelectric heat pump.

SUMMARY

A battery pack in accordance with an exemplary embodiment is provided. The battery pack includes a battery module having a first battery cell, a housing, and a first solid cooling fin. The housing is configured to hold the first battery cell therein. The first solid cooling fin has first and second panel portions. The first panel portion of the first solid cooling fin is disposed directly against the first battery cell. An end portion of the first panel portion of the first solid cooling fin extends through a first aperture in the housing. The second panel portion of the first solid cooling fin is disposed on an outer surface of the housing and is coupled to the end portion of the first panel portion of the first solid cooling fin. The battery pack further includes a thermoelectric heat pump having a first side and a second side. The first side is disposed against the second panel portion of the first solid cooling fin. The second side is disposed against a cooling manifold. The cooling manifold defines an interior region for receiving a coolant therethrough. The thermoelectric heat pump is adapted to transfer heat energy from the first solid cooling fin to the cooling manifold in response to a first electrical current flowing through the thermoelectric heat pump in a first direction, to reduce a temperature level of the first battery cell.

DETAILED DESCRIPTION

Referring to FIGS. 1-4, a battery pack 10 for generating electrical power in accordance with an exemplary embodiment is illustrated. The battery pack 10 includes a battery module 20, a thermoelectric heat pump 22, a cooling manifold 24, an inlet tube 26, an outlet tube 28, a port assembly 30, a cover 36, a first temperature sensor 38, a second temperature sensor 40, a driver circuit 42, and a microprocessor 44. An advantage of the battery pack 10 is that the battery pack 10 utilizes the thermoelectric heat pump 22 disposed between the battery module 20 and the cooling manifold 24 to either cool or heat battery cells in the battery module 20.

Figure 5:
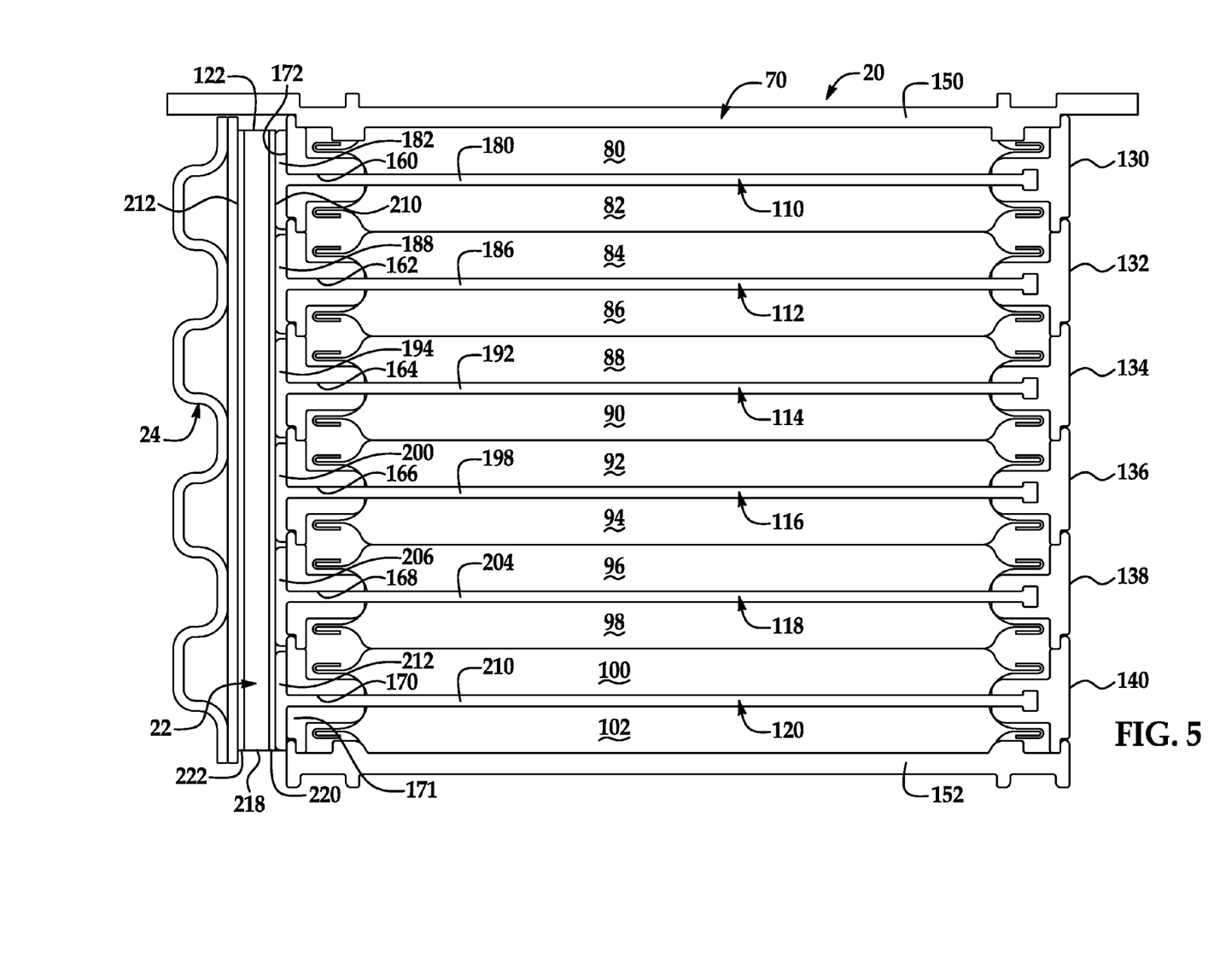
FIG. 5 is a cross-sectional schematic of a battery module, a thermoelectric heat pump, and a cooling manifold utilized in the battery pack of FIG. 1.

Referring to FIG. 5, the battery module 20 includes a housing 70, battery cells 80, 82, 84, 86, 88, 90, 92, 94, 96, 98, 100, 102 and solid cooling fins 110, 112, 114, 116, 118, 120.

The housing 70 is configured to hold the battery cells 80-102 and portions of the solid cooling fins 110-120 therein. The housing includes frame members 130, 132, 134, 136, 138, 140 and end plates 150, 152. In an exemplary embodiment, each of the frame members 130-140 are substantially rectangular ring-shaped and are constructed of plastic. Further, in an exemplary embodiment, each of the end plates 150, 152 are substantially rectangular-shaped and are constructed of plastic. The housing 70 further includes apertures 160, 162, 164, 166, 168, 170 extending through a first side 171 of the housing 70 for receiving portions of the solid cooling fins 110, 112, 114, 116, 118, 120, respectively, therethrough. Further, the first side 171 defines an outer surface 172.

The end plate 150 and the frame member 130 are coupled together and hold the battery cell 80 therebetween. Further, the frame members 130, 132 are coupled together and hold the battery cells 82, 84 therebetween, and the frame members 132, 134 are coupled together and hold the battery cells 86, 88 therebetween. Still further, the frame members 134, 136 are coupled together and hold the battery cells 90, 92 therebetween, and the frame members 136, 138 are coupled together and hold the battery cells 94, 96 therebetween. Further, the frame members 138, 140 are coupled together and hold the battery cells 98, 100 therebetween. Also, the frame member 140 and the end plate 152 are coupled together and hold the battery cell 102 therebetween.

In an exemplary embodiment, each of the battery cells 80-102 is a substantially rectangular-shaped lithium-ion battery cell. In an alternative embodiment, each of the battery cells 80-102 could be other types of battery cells known to those skilled in the art. Further, in an alternative embodiment, each of the battery cells 80-102 could and have different shapes known to those skilled in art.

Figure 4:
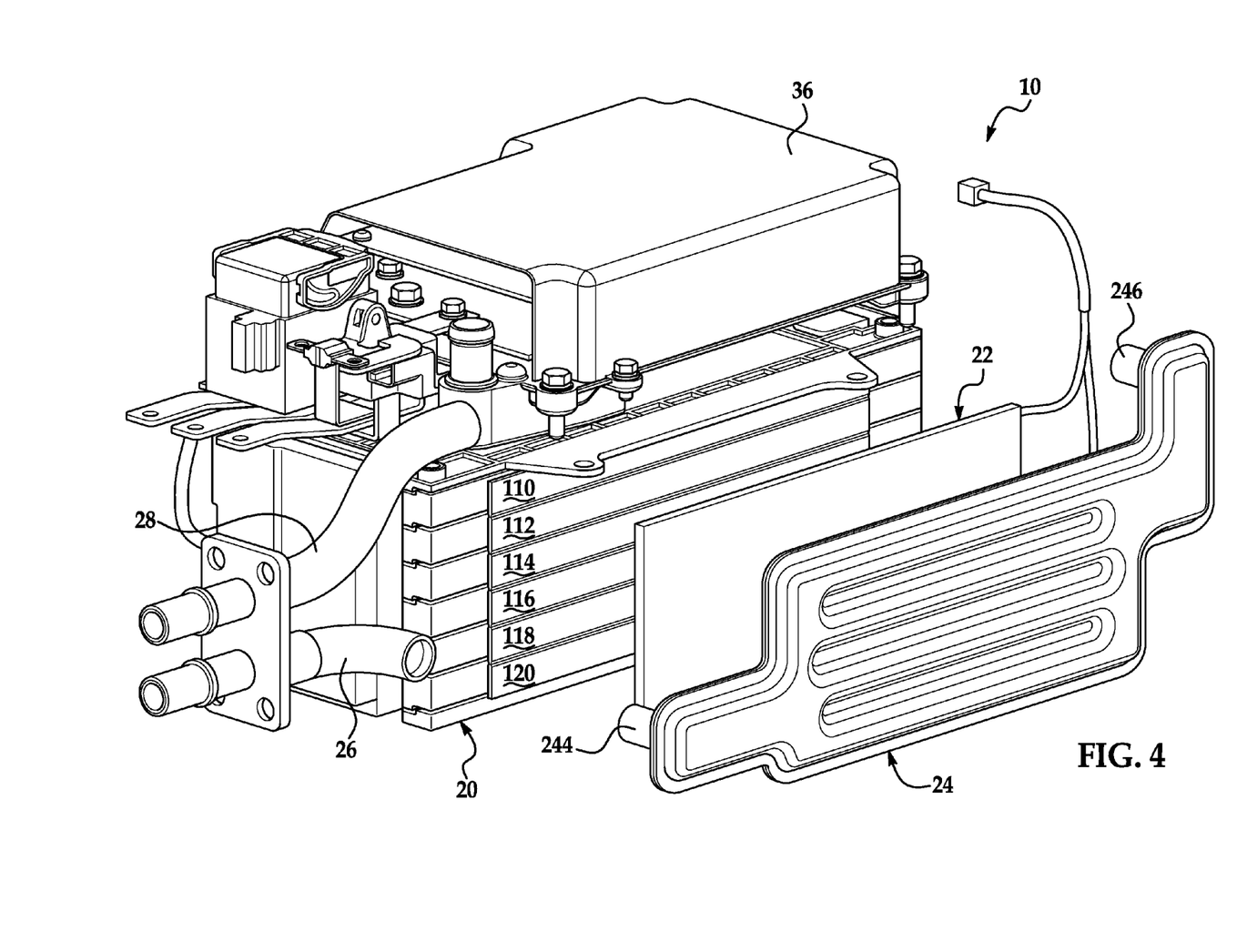
FIG. 4 is an exploded view of the battery pack of FIG. 1.

Referring to FIGS. 4 and 5, the solid cooling fins 110-120 are configured to transfer heat energy from the battery cells 80-102 to the thermoelectric heat pump 22, or to transfer heat energy from the thermoelectric heat pump 22 to the battery cells 80-102. The solid cooling fins 110-120 are constructed of a thermally conductive material. For example, the solid cooling fins 110-120 could be constructed of aluminum, copper, or graphite.

The solid cooling fin 110 includes first and second panel portions 180, 182. The first panel portion 180 is a substantially rectangular-shaped and is configured to be disposed directly against and between rectangular-shaped surfaces of the battery cells 80, 82. The first panel portion 180 has a sufficient size to cover substantially all of the adjacent rectangular-shaped surface of the battery cell 80, and to cover substantially all of the adjacent rectangular-shaped surface of the battery cell 82. An end portion of the first panel portion 180 extends through the aperture 160 in the housing 70. The second panel portion 182 is coupled to the end portion of the first panel portion 180 and extends substantially perpendicular to the first panel portion 180.

Further, the second panel portion 182 is disposed on the outer surface 172 of the housing 70.

The solid cooling fin 112 includes first and second panel portions 186, 188. The first panel portion 186 is a substantially rectangular-shaped and is configured to be disposed directly against and between rectangular-shaped surfaces of the battery cells 84, 86. The first panel portion 186 has a sufficient size to cover substantially all of the adjacent rectangular-shaped surface of the battery cell 84, and to cover substantially all of the adjacent rectangular-shaped surface of the battery cell 86. An end portion of the first panel portion 186 extends through the aperture 162 in the housing 70. The second panel portion 188 is coupled to the end portion of the first panel portion 186 and extends substantially perpendicular to the first panel portion 186. Further, the second panel portion 188 is disposed on the outer surface 172 of the housing 70.

The solid cooling fin 114 includes first and second panel portions 192, 194. The first panel portion 192 is a substantially rectangular-shaped and is configured to be disposed directly against and between rectangular-shaped surfaces of the battery cells 88, 90. The first panel portion 192 has a sufficient size to cover substantially all of the adjacent rectangular-shaped surface of the battery cell 88, and to cover substantially all of the adjacent rectangular-shaped surface of the battery cell 90. An end portion of the first panel portion 192 extends through the aperture 164 in the housing 70. The second panel portion 194 is coupled to the end portion of the first panel portion 192 and extends substantially perpendicular to the first panel portion 192. Further, the second panel portion 194 is disposed on the outer surface 172 of the housing 70.

The solid cooling fin 116 includes first and second panel portions 198, 200. The first panel portion 198 is a substantially rectangular-shaped and is configured to be disposed directly against and between rectangular-shaped surfaces of the battery cells 92, 94. The first panel portion 198 has a sufficient size to cover substantially all of the adjacent rectangular-shaped surface of the battery cell 92, and to cover substantially all of the adjacent rectangular-shaped surface of the battery cell 94. An end portion of the first panel portion 198 extends through the aperture 166 in the housing 70. The second panel portion 200 is coupled to the end portion of the first panel portion 198 and extends substantially perpendicular to the first panel portion 198. Further, the second panel portion 200 is disposed on the outer surface 172 of the housing 70.

The solid cooling fin 118 includes first and second panel portions 204, 206. The first panel portion 204 is a substantially rectangular-shaped and is configured to be disposed directly against and between rectangular-shaped surfaces of the battery cells 96, 98. The first panel portion 204 has a sufficient size to cover substantially all of the adjacent rectangular-shaped surface of the battery cell 96, and to cover substantially all of the adjacent rectangular-shaped surface of the battery cell 98. An end portion of the first panel portion 204 extends through the aperture 168 in the housing 70. The second panel portion 206 is coupled to the end portion of the first panel portion 204 and extends substantially perpendicular to the first panel portion 204. Further, the second panel portion 206 is disposed on the outer surface 172 of the housing 70.

The solid cooling fin 120 includes first and second panel portions 210, 212. The first panel portion 210 is a substantially rectangular-shaped and is configured to be disposed directly against and between rectangular-shaped surfaces of the battery cells 100, 102. The first panel portion 210 has a sufficient size to cover substantially all of the adjacent rectangular-shaped surface of the battery cell 100, and to cover substantially all of the adjacent rectangular-shaped surface of the battery cell 102. An end portion of the first panel portion 210 extends through the aperture 170 in the housing 70. The second panel portion 212 is coupled to the end portion of the first panel portion 210 and extends substantially perpendicular to the first panel portion 210. Further, the second panel portion 212 is disposed on the outer surface 172 of the housing 70.

Referring to FIGS. 4-7, the thermoelectric heat pump 22 is provided to transfer heat energy from the solid cooling fins 110-120 to the cooling manifold 24 to decrease a temperature level of battery cells in the battery module 20 in response to a first electrical current flowing through the thermoelectric heat pump 22 in a first direction. Further, the thermoelectric heat pump 22 is provided to transfer heat energy from the cooling manifold 24 to the solid cooling fins 110-120 to increase a temperature level of battery cells in the battery module 20 in response to a second electrical current flowing through the thermoelectric heat pump 22 in a second direction opposite to the first direction.

Figure 7:
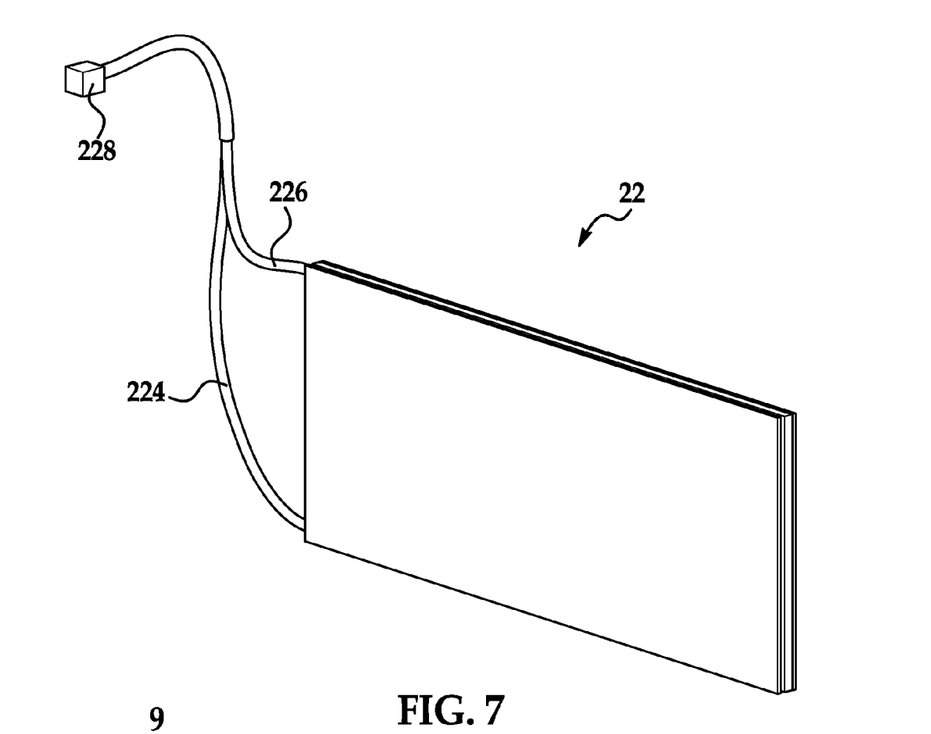
FIG. 7 is a schematic of a thermoelectric heat pump utilized in the battery pack of FIG. 1.

The thermoelectric heat pump 22 includes a thermoelectric device 218, thermally conductive layers 220, 222, electrical wires 224, 226, and an electrical connector 228. Further, the thermoelectric heat pump 22 has a first side 230 and the second side 232. The first side 230 of the thermoelectric heat pump 22 is disposed against the second panel portions of the solid cooling fins 110-120. The second side 232 of the thermoelectric heat pump 22 is disposed against the cooling manifold 24. The thermoelectric device 218 is coupled directly to and is disposed between the thermally conductive layers 220, 222. In exemplary embodiment, the thermoelectric device 218 is a Peltier heat pump. The electrical wires 224, 226 are electrically coupled to the thermoelectric device 218 and provide either the first electrical current or the second electrical current to the device 218. The electrical wires 224, 226 are further electrically coupled to the electrical connector 228 which is further electrically coupled to the driver circuit 42 (shown in FIG. 2).

Referring to FIGS. 1, 6 and 8-10, the cooling manifold 24 defines an interior region 248 for receiving a coolant flowing therethrough. The cooling manifold 24 is fluidly coupled to a coolant supply system (not shown) via the inlet tube 26, the outlet tube 28, and the port assembly 30 in a closed loop configuration such that the cooling manifold 24 receives the coolant from the coolant supply system and then returns the coolant to the coolant supply system. The cooling manifold 24 includes a first wall 240, a second wall 242, an inlet port 244, and an outlet port 246.

Figure 6:
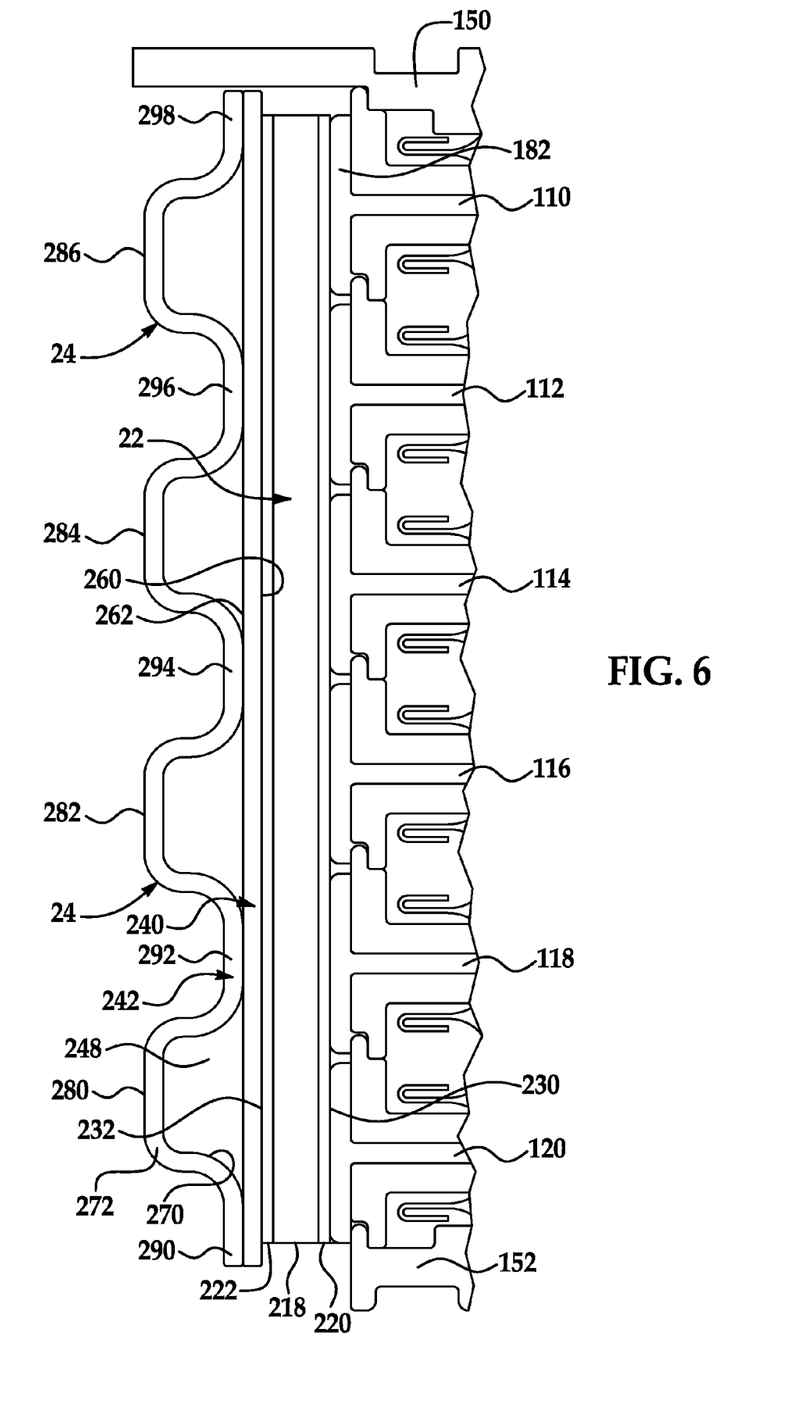
FIG. 6 is an enlarged cross-sectional schematic of a portion of the battery module, the thermoelectric heat pump, and the cooling manifold of FIG. 5.

Referring to FIG. 6, the first and second walls 240, 242 are coupled together and define the interior region 248 therebetween. The first and second walls 240, 242 are constructed of a thermally conductive material such as aluminum, steel, or stainless steel for example. As shown, the first wall 240 includes substantially flat surfaces 260, 262 disposed opposite to one another. The substantially flat surface 260 is disposed against the thermally conductive layer 222 of the thermoelectric heat pump 22. Further, portions of the substantially flat surface 262 are disposed against the second wall 242. The second wall 242 include surfaces 270, 272 disposed opposite to one another. The second wall 242 further includes raised portions 280, 282, 284, 286 and substantially flat portions 290, 292, 294, 296, 298. The raised portion 280 is coupled to and disposed between the substantially flat portions 290, 292. Further, the raised portion 282 is coupled to and disposed between the substantially flat portions 292, 294. Also, the raised portion 284 is coupled to and disposed between the substantially flat portions 294, 296. Still further, the raised portion 286 is coupled to and is disposed between the substantially flat portions 296, 298. As shown, the substantially flat portions 290-298 contact the first wall 240.

Figure 8:
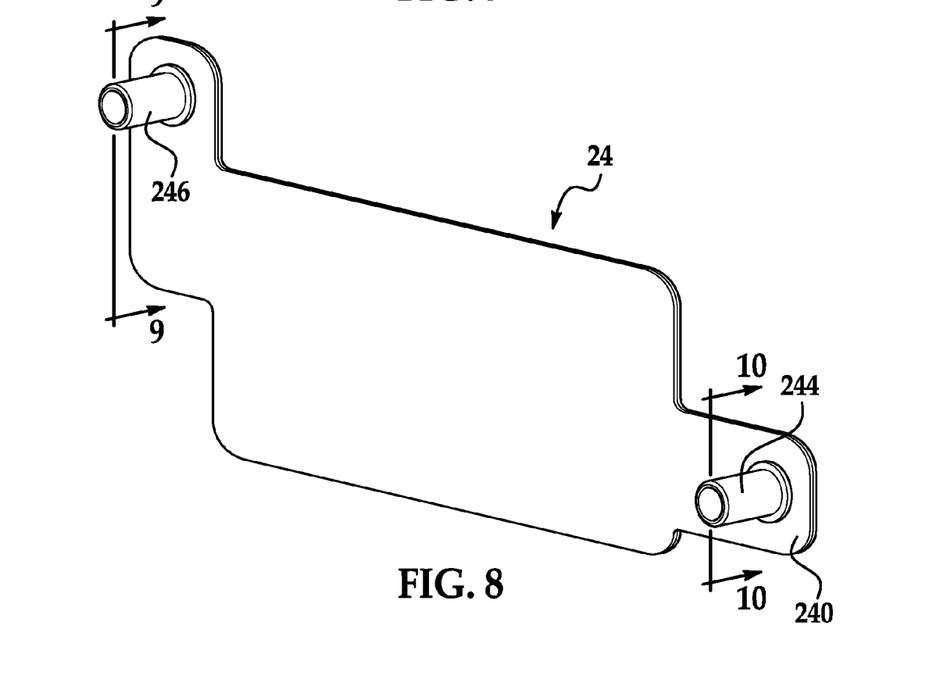
FIG. 8 is a schematic of a cooling manifold utilized in the battery pack of FIG. 1.
Figure 9:
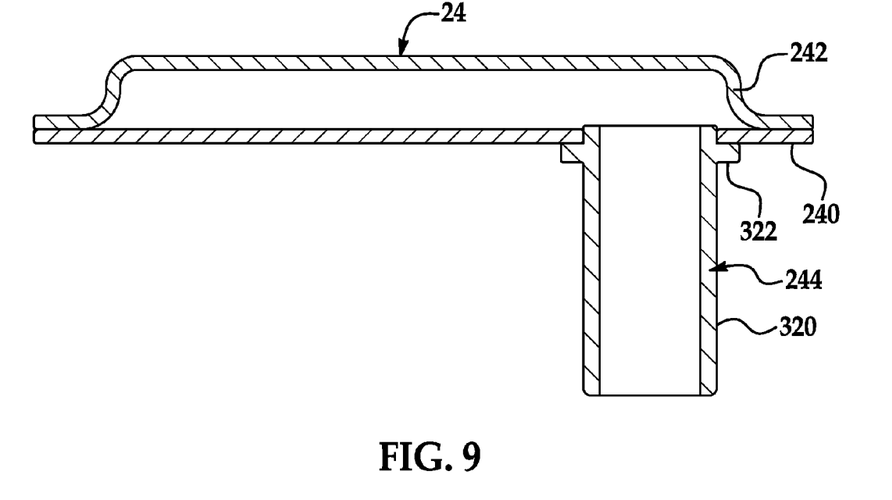
FIG. 9 is a cross-sectional schematic of a portion of the cooling manifold of FIG. 8 taken along lines 9-9.

Referring to FIGS. 6, 8 and 9, the inlet port 244 is coupled to the first wall 240 of the cooling manifold 24. The inlet port 244 includes a tubular portion 320 and a ledge portion 322 disposed around a periphery of the tubular portion 320 a predetermined distance from an end of the tubular portion 320. The ledge portion 322 is welded to the wall 240 of the cooling manifold 24.

Figure 10:
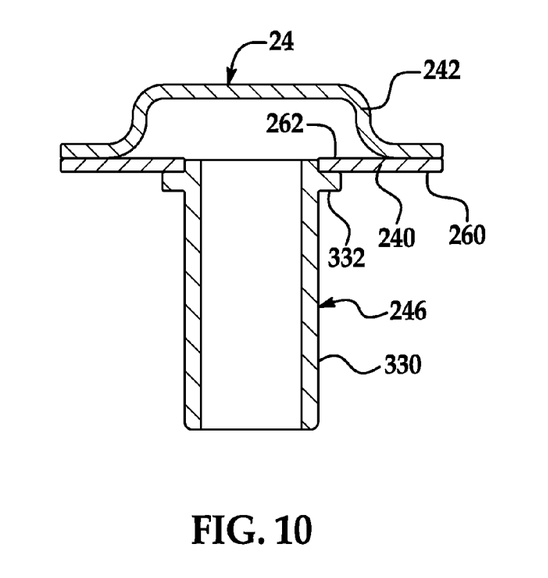
FIG. 10 is a cross-sectional schematic of a portion of the cooling manifold of FIG. 8 taken along lines 10-10.

Referring to FIGS. 6, 8 and 10, the outlet port 246 is coupled to the first wall 240 of the cooling manifold 24. The outlet port 246 includes a tubular portion 330 and a ledge portion 332 disposed around a periphery of the tubular portion 330 a predetermined distance from an end of the tubular portion 330. The ledge portion 332 is welded to the wall 240 of the cooling manifold 24.

Figure 1:
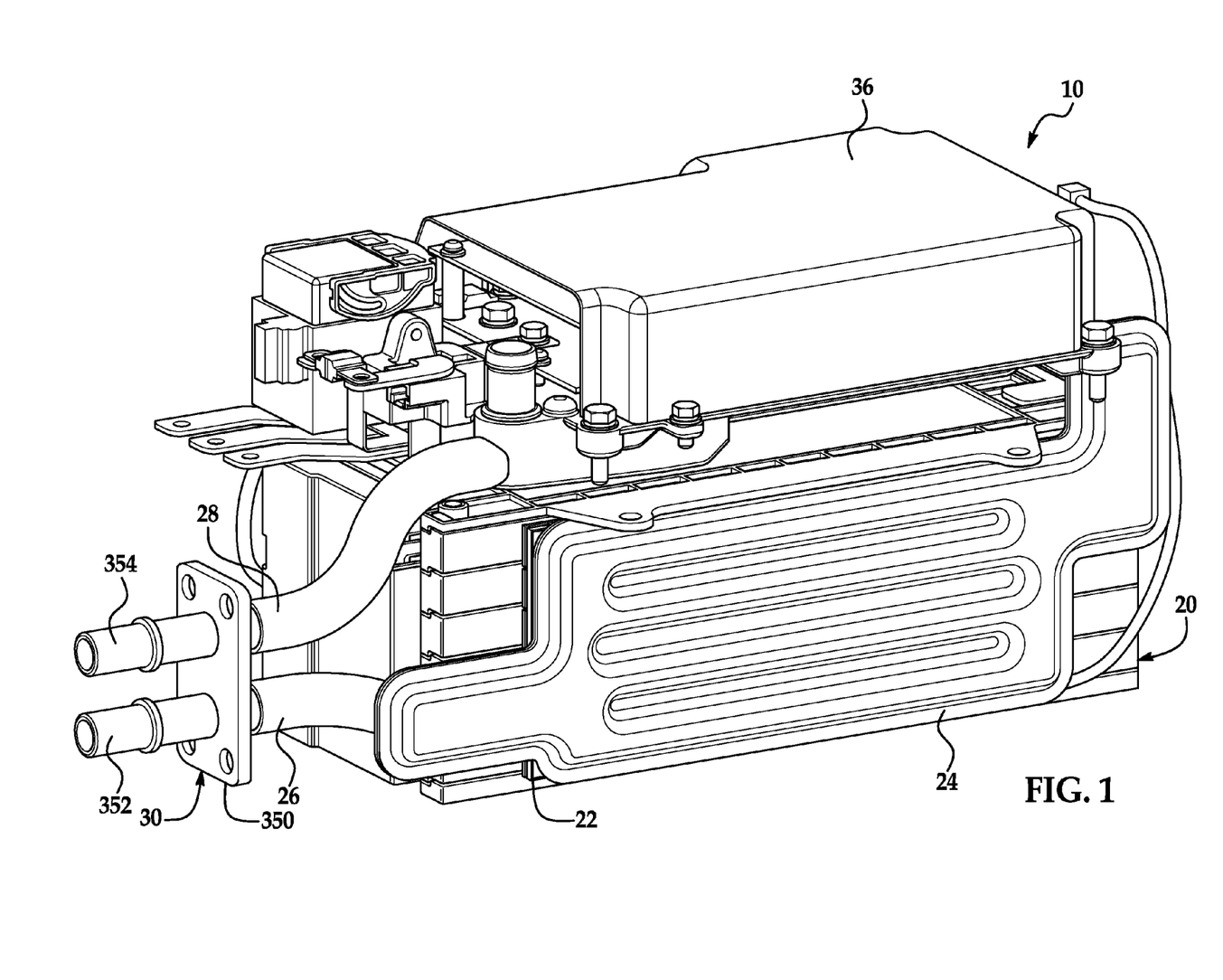
FIG. 1 is a schematic of a battery pack in accordance with an exemplary embodiment.
Figure 3:
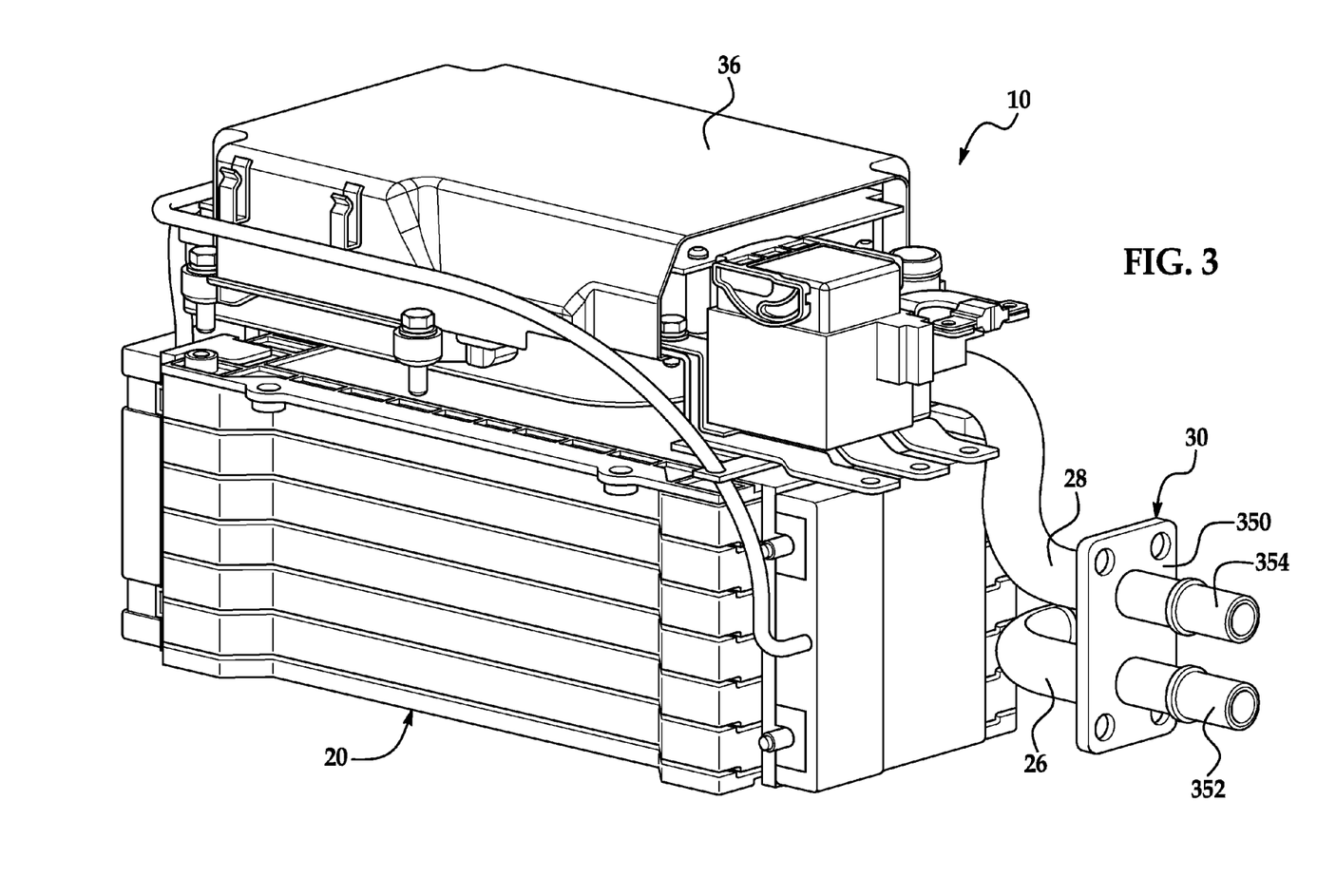
FIG. 3 is another schematic of the battery pack of FIG. 1.

Referring to FIGS. 1 and 3, the port assembly 30 is adapted to be fluidly coupled to the inlet tube 26 and the outlet tube 28. The port assembly 30 includes a plate portion 350, an inlet tubular member 352, and an outlet tubular member 354. The inlet tubular member 352 is coupled to and extends through the plate portion 350, and is further coupled to the inlet tube 26. The outlet tubular member 354 is coupled to and extends through the plate portion 350, and is further coupled to the outlet tube 28.

Figure 2:
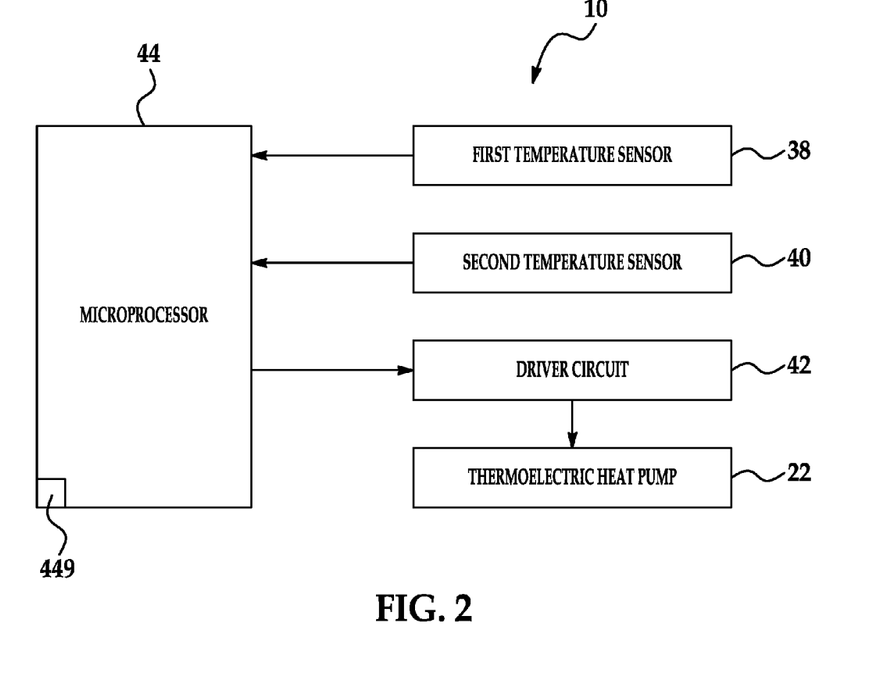
FIG. 2 is a block diagram of a portion of the battery pack of FIG. 1.

Referring to FIGS. 1-3, the cover 36 is adapted to be coupled to the battery module 20 and defines an interior space adapted to hold the driver circuit 42 and the microprocessor 44 therein.

Referring to FIG. 2, the first temperature sensor 38 is provided to generate a first temperature signal indicative of a temperature level of at least one of the battery cells 80-102, which is further indicative of a temperature level of the battery module 20, which is received by the microprocessor 44. Of course, additional temperature sensors could be utilized in the battery module 20 to measure temperature levels of more than one battery cell therein.

The second temperature sensor 40 is provided to generate a second temperature signal indicative of a temperature level of a coolant entering the cooling manifold 24 that is received by the microprocessor 44.

The microprocessor 44 is provided to control operation of the thermoelectric heat pump 22 of the battery pack 10. In particular, the microprocessor 44 is programmed to generate control signals to induce the driver circuit 42 to control operation of the thermoelectric heat pump 22. The microprocessor 44 is operably coupled to the first and second temperature sensors 38, 40 and the driver circuit 42. The microprocessor 44 receives the first and second temperature signals, from the first and second temperature sensors 38, 40, respectively, and determines the first and second temperature levels based on the first and second temperature signals, respectively. The microprocessor 44 is further programmed to generate control signals to induce the driver circuit 42 to supply electrical currents to the thermoelectric heat pump 22 based on the first and second temperature levels, as will be explained in greater detail below. The microprocessor 44 utilizes a memory device 449 that stores software instructions and associated data for implementing the methods described below.

Referring to FIGS. 2, 5 and 11-12, a flowchart of a method for controlling a temperature level of battery cells in the battery module 20 of the battery pack 10 in accordance with another exemplary embodiment is provided. For purposes of simplicity, the method is directed to controlling a temperature level of the battery cell 80.

Figure 11:
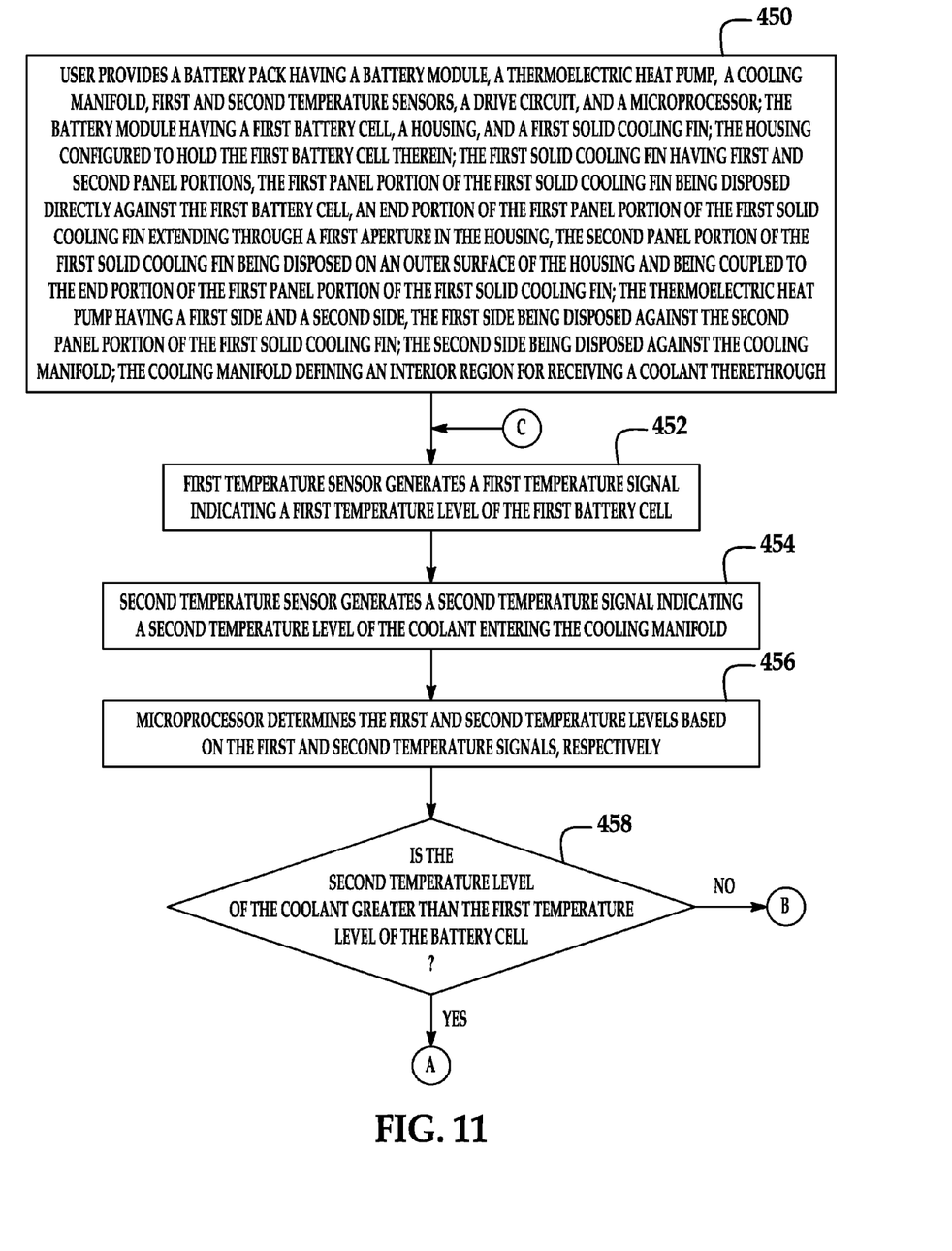
FIGS. 11 and 12 are flowcharts of a method for controlling a temperature level of a battery cell in a battery module in the battery pack of FIG. 1 in accordance with another exemplary embodiment.

At step 450, a user provides the battery pack 10 having the battery module 20, the thermoelectric heat pump 22, the cooling manifold 24, the first and second temperature sensors 38, 40, the driver circuit 42, and the microprocessor 44. The battery module 20 has the battery cell 80, the housing 70, and the solid cooling fin 110. The housing 70 is configured to hold the battery cell 80 therein. The solid cooling fin 110 has first and second panel portions 180, 182. The first panel portion 180 of the solid cooling fin 110 is disposed directly against the battery cell 80. An end portion of the first panel portion 180 of the solid cooling fin 110 extends through the aperture 160 in the housing 70. The second panel portion 182 of the solid cooling fin 110 is disposed on an outer surface of the housing 70 and is coupled to the end portion of the first panel portion 180 of the solid cooling fin 110. The thermoelectric heat pump 22 has a first side 230 and a second side 232 (shown in FIG. 6). The first side 230 is disposed against the second panel portion 182 of the solid cooling fin 110. The second side 232 is disposed against the cooling manifold 24. The cooling manifold 24 defines the interior region 248 for receiving a coolant therethrough.

At step 452, the first temperature sensor 38 generates a first temperature signal indicating a first temperature level of the battery cell 80. After step 452, the method advances to step 454.

At step 454, the second temperature sensor 40 generates a second temperature signal indicating a second temperature level of the coolant entering the cooling manifold 24. After step 454, the method advances to step 456.

At step 456, the microprocessor 44 determines the first and second temperature levels based on the first and second temperature signals, respectively. After step 456, the method advances to step 458.

At step 458, the microprocessor 44 makes a determination as to whether the second temperature level of the coolant entering the cooling manifold 24 is greater than the first temperature level (e.g., 50 degrees Celsius) of the battery cell 80. If the value of step 458 equals "yes", the method advances to step 460. Otherwise, the method advances to step 462.

At step 460, the microprocessor 44 generates a first control signal to induce the driver circuit 42 to supply a first electrical current to the thermoelectric heat pump 22 in a first direction such that the thermoelectric heat pump 22 transfers heat energy from the solid cooling fin 110 to the cooling manifold 24, to reduce a temperature level of the battery cell 80. After step 460, the method advances to step 462.

At step 462, the microprocessor 44 makes a determination as to whether the first temperature level of the battery cell 80 is less than a second threshold temperature level (e.g., -10 degrees Celsius). If the value of step 462 equals "yes", the method advances to step 464. Otherwise, the method advances to step 466.

At step 464, the microprocessor 44 generates a second control signal to induce the driver circuit 42 to supply a second electrical current to the thermoelectric heat pump 22 in a second direction such that the thermoelectric heat pump 22 transfers heat energy from the cooling manifold 24 to the solid cooling fin 110, to increase a temperature level of the battery cell 80. The second direction is opposite to the first direction. After step 464, the method advances to step 465.

At step 465, the microprocessor 44 sets a first flag equal to "true." After step 465, the method advances to step 466.

Figure 12:
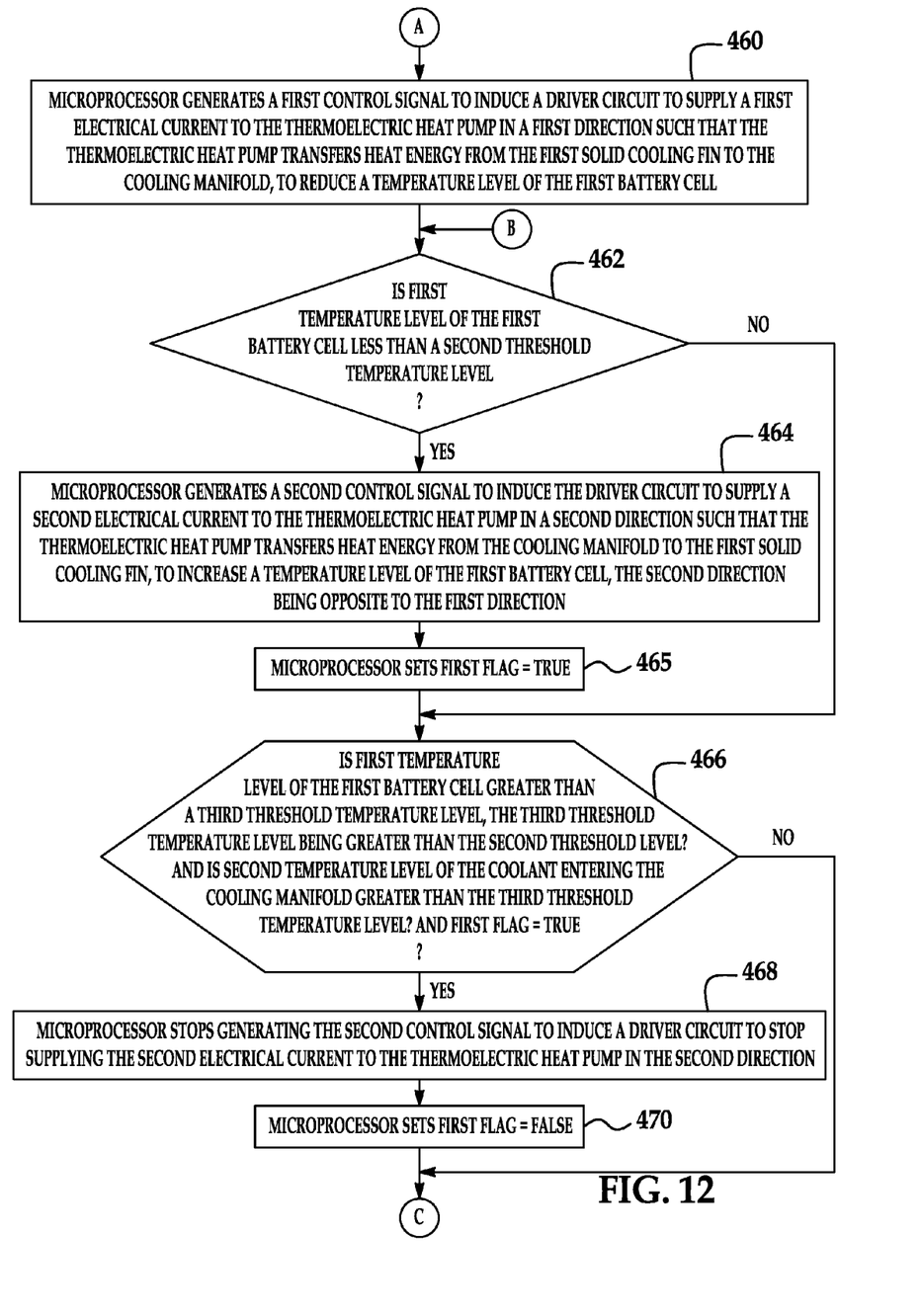

At step 466, the microprocessor 44 makes a determination as to whether the first temperature level of the battery cell 80 is greater than a third threshold temperature level (e.g., 0 degrees Celsius), and whether the second temperature level of the coolant entering the cooling manifold 24 is greater than the third threshold temperature level, and whether the first flag equals "true." The third threshold temperature level (e.g., 0 degrees Celsius) is greater than the second threshold temperature level (e.g., −10 degrees Celsius). If the value of step 466 equal "yes", the method advances to step 468. Otherwise, the method returns to step 452.

At step 468, the microprocessor 44 stops generating the second control signal to induce the driver circuit 42 to stop supplying the second electrical current to the thermoelectric heat pump 22 in the second direction. After step 468, the method advances to step 470.

At step 470, the microprocessor 44 sets the first flag equal to "false." After step 470, the method returns to step 452.

The above-described method can be at least partially embodied in the form of one or more memory devices or computer readable media having computer-executable instructions for practicing the methods. The memory devices can comprise one or more of the following: hard drives, RAM memory, flash memory, and other computer-readable media known to those skilled in the art; wherein, when the computer-executable instructions are loaded into and executed by one or more microprocessors or computers, the one or more microprocessors or computers become an apparatus programmed to practice the associated steps of the method.

The battery pack 10 and the method for cooling a temperature level of battery cells in a battery module 20 of the battery pack 10 provide a substantial advantage over other battery packs and methods. In particular, the battery pack 10 utilizes An advantage of the battery pack 10 is that the battery pack 10 utilizes a thermoelectric heat pump disposed between a battery module and a cooling manifold to either cool or heat the battery module.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack, comprising:
   a battery module having a first battery cell, a housing, and a first solid cooling fin; the housing configured to hold the first battery cell therein; the first solid cooling fin having first and second panel portions, the first panel portion of the first solid cooling fin being disposed directly against the first battery cell, an end portion of the first panel portion of the first solid cooling fin extending through a first aperture in the housing, the second panel portion of the first solid cooling fin being disposed on an outer surface of the housing and being coupled to the end portion of the first panel portion of the first solid cooling fin;
   a thermoelectric heat pump having a first side and a second side, the first side being disposed against the second panel portion of the first solid cooling fin; the second side being disposed against a cooling manifold; the cooling manifold defining an interior region receiving a coolant therethrough; and
   the thermoelectric heat pump transfers heat energy from the first solid cooling fin to the cooling manifold in response to a first electrical current flowing through the thermoelectric heat pump in a first direction, to reduce a temperature level of the first battery cell.

2. The battery pack of claim 1, wherein the cooling manifold being adapted to transfer the heat energy received from the thermoelectric heat pump to the coolant flowing through the cooling manifold.

3. The battery pack of claim 1, wherein the battery module further includes a second battery cell disposed against the first panel portion of the first solid cooling fin such that the first panel portion of the first solid cooling fin is disposed between the first and second battery cells, the housing further configured to hold the second battery cell therein.

4. The battery pack of claim 1, wherein the first panel portion of the first solid cooling fin extends substantially perpendicular to the second panel portion of the first solid cooling fin.

5. The battery pack of claim 3, wherein the battery module further includes third and fourth battery cells and a second solid cooling fin;
   the second solid cooling fin having first and second panel portions, the first panel portion of the second solid cooling fin being disposed directly against and between the third and fourth battery cells, an end portion of the first panel portion of the second solid cooling fin extending through a second aperture in the housing, the second panel portion of the second solid cooling fin being disposed on the outer surface of the housing and being coupled to the end portion of the first panel portion of the second solid cooling fin; and
   the first side of the thermoelectric heat pump being disposed against the second panel portion of the second solid cooling fin.

6. The battery pack of claim 1, wherein the thermoelectric heat pump is a Peltier heat pump.

7. The battery pack of claim 1, wherein the cooling manifold has a substantially flat surface that contacts the second side of the thermoelectric heat pump.

8. The battery pack of claim 1, wherein the cooling manifold includes first and second walls, an inlet port, and an outlet port; the first and second walls being coupled together and defining the interior region therebetween, the inlet and outlet ports are coupled to the first wall and fluidly communicate with the interior region.

9. The battery pack of claim 1, further comprising:
   a first temperature sensor being adapted to generate a first temperature signal indicating a first temperature level of the first battery cell;
   a second temperature sensor being adapted to generate a second temperature signal indicating a second temperature level of the coolant entering the cooling manifold;
   a microprocessor operably coupled to first and second temperature sensors and receiving the first and second temperature signals, the microprocessor programmed to determine the first and second temperature levels based on the first and second temperature signals, respectively; and
   the microprocessor further programmed to generate a first control signal to induce a driver circuit to supply the first electrical current to the thermoelectric heat pump in the first direction if the second temperature level is greater than the first temperature level.

10. The battery pack of claim 1, wherein the thermoelectric heat pump further adapted to transfer heat energy from the cooling manifold to the first solid cooling fin in response to a second electrical current flowing through the thermoelectric heat pump in a second direction, to increase a temperature level of the first battery cell, the second direction being opposite to the first direction.

11. The battery pack of claim 10, further comprising:

a first temperature sensor being adapted to generate a first temperature signal indicating a first temperature level of the first battery cell;

a second temperature sensor being adapted to generate a second temperature signal indicating a second temperature level of the coolant entering the cooling manifold;

a microprocessor operably coupled to the first and second temperature sensors and receiving the first and second temperature signals, the microprocessor programmed to determine the first and second temperature levels based on the first and second temperature signals, respectively; and the microprocessor further programmed to generate a first control signal to induce a driver circuit to supply the second electrical current to the thermoelectric heat pump in the second direction if the first temperature level of the first battery cell is less than a first threshold temperature level.

12. The battery pack of claim 11, wherein the microprocessor further programmed to stop generating the first control signal to induce the driver circuit to stop supplying the second electrical current to the thermoelectric heat pump in the second direction, if both the first temperature level of the first battery cell is greater than a second threshold temperature level, and the second temperature level of the coolant entering the cooling manifold is greater than the second threshold temperature level; the second threshold temperature level being greater than the first threshold temperature level.

* * * * *